(No Model.)

E. BAUSCH.
MICROSCOPE ATTACHMENT.

No. 588,689. Patented Aug. 24, 1897.

Witnesses.
G. Willard Rich.
Grace A. Koda.

Inventor.
Edward Bausch
by Church & Church
his Attorneys

UNITED STATES PATENT OFFICE.

EDWARD BAUSCH, OF ROCHESTER, NEW YORK.

MICROSCOPE ATTACHMENT.

SPECIFICATION forming part of Letters Patent No. 588,689, dated August 24, 1897.

Application filed June 23, 1897. Serial No. 641,945. (No model.)

*To all whom it may concern:*

Be it known that I, EDWARD BAUSCH, of Rochester, in the county of Monroe and State of New York, have invented certain new and useful Improvements in Microscope Attachments; and I do hereby declare the following to be a full, clear, and exact description of the same, reference being had to the accompanying drawings, forming a part of this specification, and to the reference-numerals marked thereon.

My present invention relates to microscopes, and has for its object to provide an improved carrier for the slide or object to be viewed which is simple in construction, may be adapted to any of the ordinary types of microscopes, and so manipulated and adjusted that the operator may not only move the object under observation into any position required, but may remove the holding device and replace it and secure absolutely the same positions and adjustments of the object as before such removal; and to these and other ends it consists in certain improvements hereinafter described, the novel features being pointed out in the claims at the end of this specification.

Figure 1:
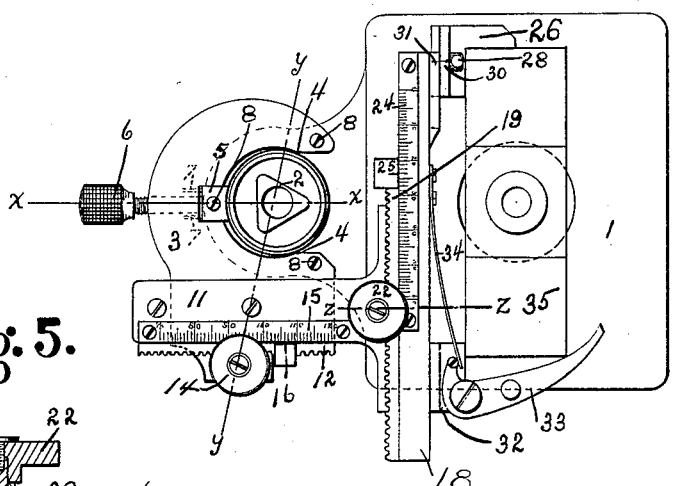
Figure 5:
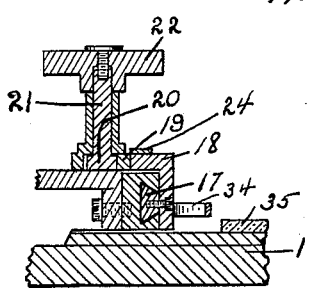
Figure 2:
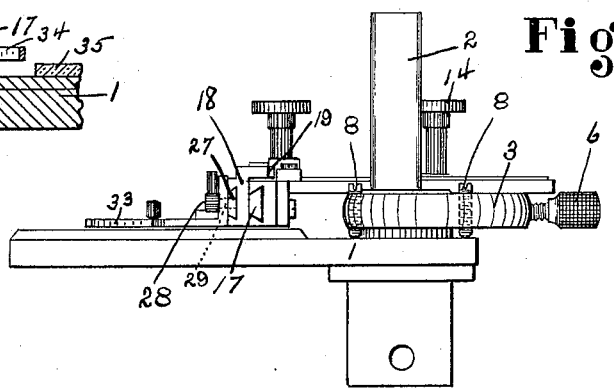
Figure 3:
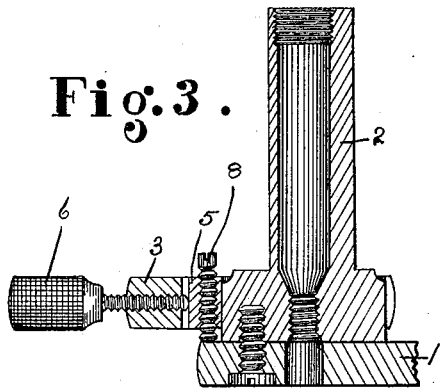
Figure 4:
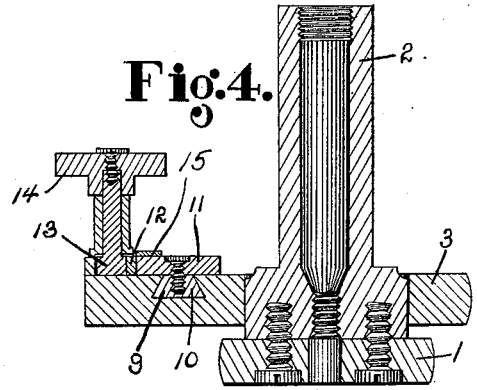

In the accompanying drawings, Figure 1 is a plan view showing the application of my invention to a microscope stage and pillar, the lens-tube and sleeve carrying it being removed; Fig. 2, a side view of the same; Fig. 3, a sectional view on the line $x\,x$ of Fig. 1; Fig. 4, a similar view on the line $y\,y$ of Fig. 1; Fig. 5, a sectional view on the line $z\,z$ of Fig. 1.

Similar reference-numerals in the several figures indicate similar parts.

1 indicates the stage or platform of a microscope, which may be of the ordinary or any preferred construction, to which is attached the usual pillar 2, upon which the sleeve carrying the lens-tube slides, the lower end of said pillar being preferably provided with an enlarged portion, as shown, slightly above the level of the stage. These parts are sufficient to indicate to one skilled in the art the portion of the ordinary microscope to which my attachment is applied, as will be seen more particularly by reference to my Patent No. 577,344.

The base or support of my slide-carrier is indicated by 3 and is preferably in the form of a thick plate or yoke having an open-sided aperture therein, the opening in said plate or yoke being slightly less than the diameter of the pillar 2, so that the points indicated by 4 4 will bear against the front side of the pillar, as shown in Fig. 1. At the rear of the open portion of the yoke is a bearing-block 5, sliding in a suitable recess and adapted to be adjusted back and forth by a screw 6, engaging its rear end, said block being provided with pins 7 7, entering recesses formed in the back of the yoke, as shown in dotted lines in Fig. 1, whereby the block may be moved forward by the screw, operating to clamp the yoke or plate to the pillar, engaging the latter at the points 4 4 at the front and permitting the removal of the yoke by loosening the screw, as will be understood.

The two forward portions of the yoke and also the block 5 are provided with leveling-screws 8, passing through the yoke and block, and resting upon the upper rear portion of the stage or platform, as shown particularly in Figs. 2 and 3, by which means the yoke may be leveled, or slightly inclined, if desired, and the slide-carrier caused at all times to move in the proper plane over the stage, as will be described. On one side of the yoke is provided a dovetailed groove 9, in which operates a correspondingly-shaped plate 10, attached to a sliding arm 11, the latter being provided with a rack 12 on its outer side, with which coöperates a pinion 13, having a milled head 14, thus providing for the back-and-forth adjustment of the arm 11. Said arm is further provided with a scale 15, coöperating with an index 16, attached to the yoke or frame 3. The outer portion of the sliding arm 11 is provided with a dovetailed way, in which operates a correspondingly-shaped rib 17, formed upon or secured to the laterally-movable slide-carrying frame 18, said frame 18 having upon it a rack 19, with which engages a pinion 20 on the lower end of an arbor 21, provided with a milled operating-head 22. The slide-carrying frame 18 is also provided with a scale 24, with which coöperates an index on the plate 25 for indicating the extent of the lateral movement. At one end of the frame 18 is provided an adjustable angular block 26, having a dovetailed rib 27, sliding in a correspondingly-shaped way in the front side of the frame 18 and adapted to be secured rigidly in adjusted position by a suitable locking-screw 28, having an operating-arm 29, as shown in Fig. 2. The upper edge of this block 26 is provided with an index 30, coöperating with a graduated scale 31 on the frame 18. Secured to the opposite end of the front of the slide or frame 18 is a block 32, having pivoted upon it an angular lever 33, the shorter arm of the lever being engaged by a spring 34, while the longer arm is adapted to engage and press upon the corner of the microscope slide or glass 35, or other object under observation, holding it in the angle of the adjustable block 26, as shown particularly in Fig. 1. The adjustability of the block 26 enables slides of various lengths to be clamped and held, and by reason of the adjustment of the carrying-frame 18 back and forth and across the stage the glass 35 or object may be moved, as desired, beneath the objective of the microscope, and all portions viewed and the distances between the parts measured by observing the scales 15 and 24.

In using the device after the base plate or yoke 3 has been adjusted to the standard and leveled up properly the arm or slide 11 and its connected parts may, if desired, be slid longitudinally and removed bodily from the said yoke and afterward returned thereto, and precisely the same position of the observed object on the slide 35 may be obtained as before such removal. These leveling-screws enable the yoke to be tilted slightly if it is desired to adjust the object under observation at an angle relative to the plane of the stage, or the yoke may be vertically adjusted to accommodate thick glasses or objects.

The construction and manner of applying the yoke or support 3, in which the way for the arm or plate 11 is arranged parallel with the opening in the yoke and the clamping-screw 6 is at the rear of said opening, is particularly advantageous, as, assuming the operator to be careless in operating the screw 6, it will be observed that excessive tightening of the latter will not affect in any manner the way on the yoke 3 in which the slide 11 operates, because the bearing on the pillar will be at the points 4 4 and 5, and the rear of the yoke being the weakest part excessive pressure on the screw might tend to separate the points 4 4; but in this event the outer arm would yield and the strong portion of the yoke 3, having the way in it, would be unaffected. Differences of this nature, while perhaps not apparent in larger machines, are of considerable moment in microscopes where variations of hundredths and thousandths of an inch are quite apparent to the observer, and a very slight bending of the side of the plate 3 would destroy the parallelism of the way for the arm 11 and prevent the proper operation of the latter.

The yoke is removed from the pillar by disengaging the screw-clamp and then raising it above the enlargement on the pillar, when the narrower or triangular portion of the latter will permit it to be moved rearwardly and clear of the pillar.

I claim as my invention—

1. In a microscope attachment, the combination with the yoke or plate adapted to embrace the pillar of a microscope, having the opening narrower at the mouth than the diameter of the pillar, and the adjustable clamping-screw at the rear of the yoke-opening, of the adjustable arm, movable ways in the yoke extending in a plane substantially parallel with that of the opening in the yoke, and an object-carrier on said arm, substantially as described.

2. In a microscope attachment, the combination with the yoke or plate, clamping devices for removably securing it to the pillar of a microscope, and leveling-screws on said yoke, of an object-holder adjustable upon the yoke, substantially as described.

3. In a microscope attachment, the combination with the yoke or plate, having the opening and the two contacting points on opposite sides of the opening adapted to engage the pillar of a microscope, of the adjustable clamping-block opposite the opening in the yoke, the leveling-screws near the contacting points of the yoke, the leveling-screw passing through the adjustable clamping-block, and an object-holder adjustable on the yoke, substantially as described.

4. In a microscope attachment, the combination with the yoke or plate, clamping devices for attaching it to the pillar of a microscope, and a way formed in said yoke, of an arm or slide adjustable in and longitudinally removable from said way, rack-and-pinion connections between the yoke and arm, indicia between the arm and yoke for indicating their relative adjustment, and an object-carrier frame adjustable laterally of the last-mentioned arm, rack-and-pinion connections between the carrier-frame and arm, and indicia for indicating their relative adjustment, substantially as described.

5. In a microscope attachment, the combination with the yoke or plate 3, having the contact-points 4, 4, the block 5, adjusting-screw 6, the leveling-screws 8, and the way 9 in the yoke, of the sliding arm 11, having the rack 12, the arbor and the pinion 13 thereon, the plate 18 sliding on the arm 11, having the rack 19, the arbor 21 and the pinion thereon, indicia between the plate and arm for indicating their relative adjustment, and an object-clamp mounted on the plate 18, substantially as described.

6. In a microscope attachment, the combination with the yoke 3, having the contact-points 4, 4, the block 5, and the adjusting-screw 6, and the way 9 in the yoke extending substantially parallel with the plane of movement of the adjusting-screw, of the adjustable arm 11 having the portion fitting the way 9 and removable from the yoke, and the object-carrier adjustably mounted on the arm 11, substantially as described.

EDWARD BAUSCH.

Witnesses:
GEORGE HOMMEL,
EDM. H. GENTCIMS.